United States Patent
Yoshida et al.

(10) Patent No.: US 11,360,575 B2
(45) Date of Patent: Jun. 14, 2022

(54) CONTROL METHOD FOR DISPLAY SYSTEM AND DISPLAY SYSTEM

(71) Applicant: SEIKO EPSON CORPORATION, Tokyo (JP)

(72) Inventors: Masataka Yoshida, Azumino (JP); Koichiro Ota, Omachi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/878,750

(22) Filed: May 20, 2020

(65) Prior Publication Data

US 2020/0371605 A1  Nov. 26, 2020

(30) Foreign Application Priority Data

May 21, 2019 (JP) .............................. JP2019-095429

(51) Int. Cl.
| | | |
|---|---|---|
| *G06F 3/03* | (2006.01) | |
| *G03B 21/10* | (2006.01) | |
| *G06F 3/0346* | (2013.01) | |
| *G06F 3/14* | (2006.01) | |

(52) U.S. Cl.
CPC ........... *G06F 3/0304* (2013.01); *G03B 21/10* (2013.01); *G06F 3/0346* (2013.01); *G06F 3/1454* (2013.01)

(58) Field of Classification Search
None
See application file for complete search history.

(56) References Cited

U.S. PATENT DOCUMENTS

| | | | |
|---|---|---|---|
| 9,524,574 B2 | 12/2016 | Ota et al. | |
| 2005/0231532 A1* | 10/2005 | Suzuki | G06F 3/0338 345/633 |
| 2010/0262925 A1* | 10/2010 | Liu | H04L 65/1053 715/759 |
| 2014/0160153 A1* | 6/2014 | Singh | G06Q 10/101 345/629 |
| 2015/0199166 A1* | 7/2015 | Eguchi | G06F 3/1454 345/2.2 |
| 2015/0310756 A1* | 10/2015 | Nakamura | G06Q 50/20 434/362 |
| 2016/0260410 A1* | 9/2016 | Fujimori | G06F 3/0488 |
| 2017/0052621 A1* | 2/2017 | Ota | H04L 51/10 |
| 2018/0204348 A1* | 7/2018 | Natori | G06T 7/73 |

FOREIGN PATENT DOCUMENTS

| | | |
|---|---|---|
| JP | 2013-065125 A | 4/2013 |
| JP | 2013-246285 A | 12/2013 |
| JP | 2015-149648 A | 8/2015 |

* cited by examiner

*Primary Examiner* — Matthew Yeung
(74) *Attorney, Agent, or Firm* — Oliff PLC

(57) ABSTRACT

A first projector transmits first image information to each of a second projector and a third projector. The second projector displays a first image on a screen based on the first image information, detects the position of a pointer with respect to the screen, and transmits first information indicating the position of the pointer to the first projector. The first projector generates a first drawing object based on the first information and transmits second image information including the first drawing object to each of the second projector and the third projector. Each of the second projector and the third projector displays a second image based on the second image information.

9 Claims, 10 Drawing Sheets

CONTROL METHOD FOR DISPLAY SYSTEM AND DISPLAY SYSTEM

The present application is based on, and claims priority from JP Application Serial Number 2019-095429, filed May 21, 2019, the disclosure of which is hereby incorporated by reference herein in its entirety.

BACKGROUND

1. Technical Field

The present disclosure relates to a control method for a display system and the display system.

2. Related Art

There has been known an interactive technique for enabling a user to draw characters, figures, and the like on a projection screen of a projector using a dedicated pen, a finger, or the like.

There has been known a bidirectional interactive technique for sharing information such as characters and figures drawn by a projector having such an interactive function with other projectors provided in remote locations through a network (see, for example, JP A-2015-149648 (Patent Literature 1).

In an image projection system described in Patent Literature 1, the projector transmits pen drawing information input by the dedicated pen to the other projectors coupled through the network. The other projectors reflect a drawing state by the pen in a remote location on devices of the other projectors based on the received pen drawing information.

On the other hand, when the image projection system described in Patent Literature 1 is used as a teleconference system, not only the pen drawing information but also a projected video is requested to be shared together with an external video. The external video is a video input from the outside and is, for example, a slide material image for a meeting.

In the image projection system described in Patent Literature 1, a plurality of projectors draw characters, figures, and the like input by a pen based on pen drawing information shared among the plurality of projectors. A projector not having a pen drawing function (a so-called noninteractive projector) cannot display image information such as characters and figures by the pen input on a screen. Therefore, the projector not having the pen drawing function cannot share the information such as the characters and the figures input by the pens in the projectors (so-called interactive projectors) having the pen drawing function.

SUMMARY

An aspect of the present disclosure is directed to a control method for a display system including a first display device, a second display device, and a third display device communicably coupled to one another. The first display device transmits first image information to each of the second display device and the third display device. The second display device displays a first image on a first display surface based on the first image information. The second display device detects a position of a first pointer with respect to the first display surface. The second display device transmits first information indicating the position of the first pointer to the first display device. The first display device generates a first drawing object based on the first information and transmits second image information including the first drawing object to each of the second display device and the third display device. Each of the second display device and the third display device displays a second image based on the second image information.

In the control method for a display system, the second display device may be prohibited from transmitting the first image information and the second image information to a fourth display device communicably coupled to the second display device, and the third display device may be prohibited from transmitting the first image information and the second image information to a fifth display device communicably coupled to the third display device.

In the control method for a display system, the second display device may be prohibited from transmitting the first image information and the second image information to the fourth display device by being prohibited to display a menu for executing a server function, and the third display device may be prohibited from transmitting the first image information and the second image information to the fifth display device by being prohibited to display the menu.

In the control method for a display system, the second display device may generate a second drawing object based on the first information and display a third image including the second drawing object on the first display surface.

In the control method for a display system, the second display device may end the display of the third image on the first display surface when a predetermined time elapses after the display of the third image on the first display surface is started.

In the control method for a display system, the second display device may end the display of the third image on the first display surface when receiving the second image information from the first display device.

In the control method for a display system, the second display device may detect the position of the first pointer with respect to a display region for the first image on the first display surface.

In the control method for a display system, the first display device may superimpose the first drawing object on the first image and generate the second image information.

In the control method for a display system, the first display device may display the first image on a second display surface, detect a position of a second pointer with respect to the second display surface, generate a third drawing object based on the position of the second pointer, and transmit fourth image information including the first drawing object and the third drawing object to each of the second display device and the third display device, and each of the second display device and the third display device may display a fourth image based on the fourth image information.

In the control method for a display system, the first display device may superimpose the first drawing object and the third drawing object on the first image and generate the fourth image information.

Another aspect of the present disclosure is directed to a display system including a first display device, a second display device, and a third display device communicably coupled to one another. The first display device includes a first transmitting section configured to transmit first image information to each of the second display device and the third display device. The second display device includes: a display control section configured to display a first image on a first display surface based on the first image information; a position detecting section configured to detect a position of a pointer with respect to the first display surface; and a second transmitting section configured to transmit first information indicating the position of the pointer to the first display device. The first display device generates a drawing object based on the first information. The first transmitting section transmits second image information including the drawing object to each of the second display device and the third display device. Each of the second display device and the third display device displays a second image based on the second image information.

DESCRIPTION OF EXEMPLARY EMBODIMENTS

An embodiment is explained with reference to the accompanying drawings.

Figure 1:
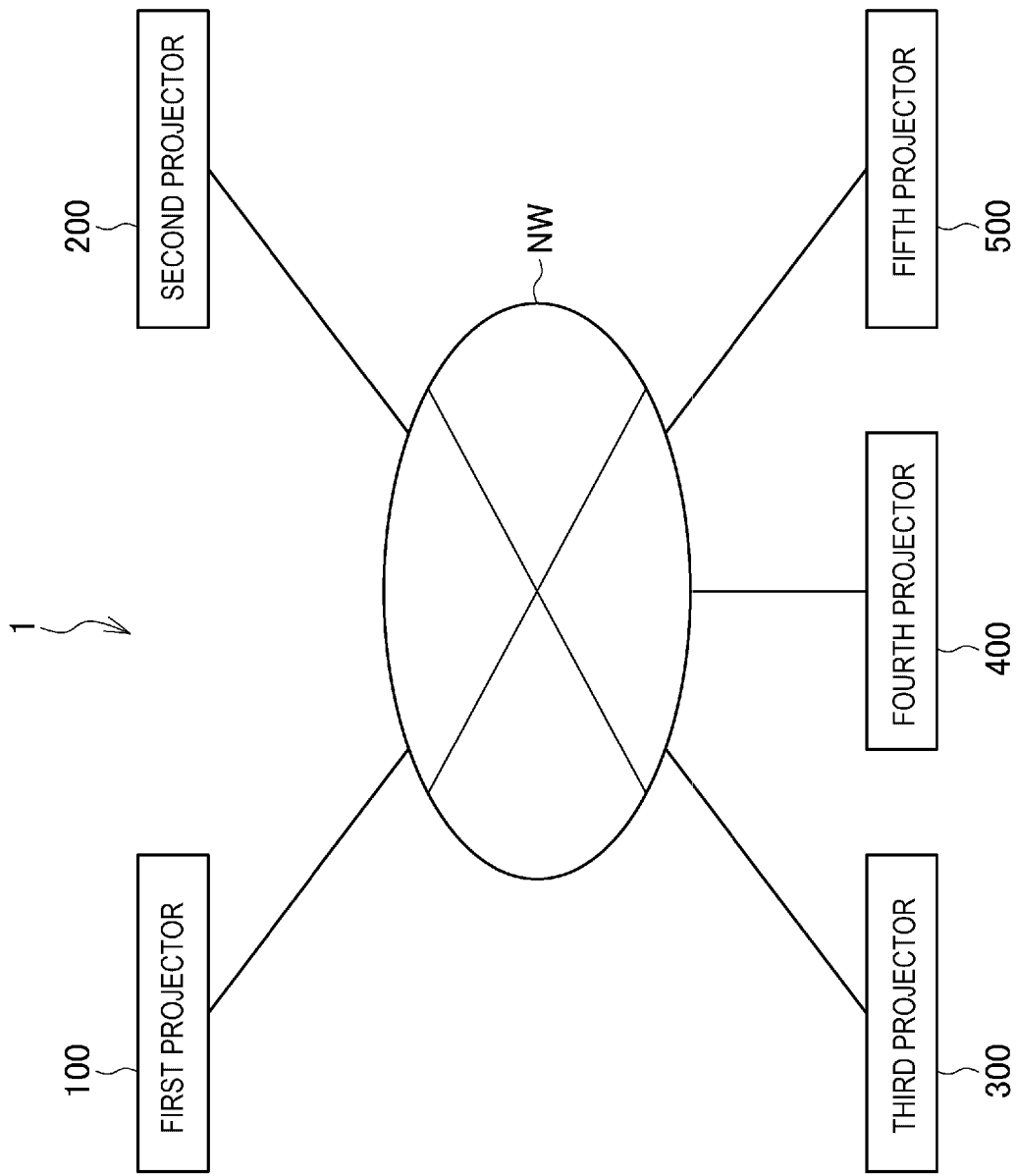
FIG. 1 is a diagram showing an example of an overall configuration of a display system according to an embodiment.

1. Configuration of a Display System 1-1. Overall Configuration of the Display System FIG. 1 is a diagram showing an example of an overall configuration of a display system 1 according to the embodiment.

The display system 1 includes a first projector 100, a second projector 200, and a third projector 300.

The first projector 100, the second projector 200, and the third projector 300 are communicably coupled to one another via a network NW. The network NW is, for example, the Internet.

In this embodiment, the network NW is the Internet. However, embodiments of the present disclosure are not limited to this. The network NW may be a LAN (Local Area Network) or may be a WAN (Wide Area Network).

A fourth projector 400 and a fifth projector 500 are coupled to the network NW.

The second projector 200 is communicably coupled to the fourth projector 400 via the network NW.

The third projector 300 is communicably coupled to the fifth projector 500 via the network NW.

The first projector 100 projects and displays an image on a screen SC1. The second projector 200 projects and displays an image on a screen SC2. The third projector 300 projects and displays an image on a screen SC3. In the following explanation, the screen SC1, the screen SC2, and the screen SC3 are sometimes collectively referred to as screen SC.

The screen SC1 corresponds to an example of the "second display surface" and the screen SC2 corresponds to an example of the "first display surface."

The first projector 100 corresponds to an example of the "first display device", the second projector 200 corresponds to an example of the "second display device", and the third projector 300 corresponds to an example of the "third display device." The fourth projector 400 corresponds to an example of the "fourth display device" and the fifth projector 500 corresponds to an example of the "fifth display device."

1-2. Schematic Configurations of the Projector, a Pointer, and the Screen

Figure 2:
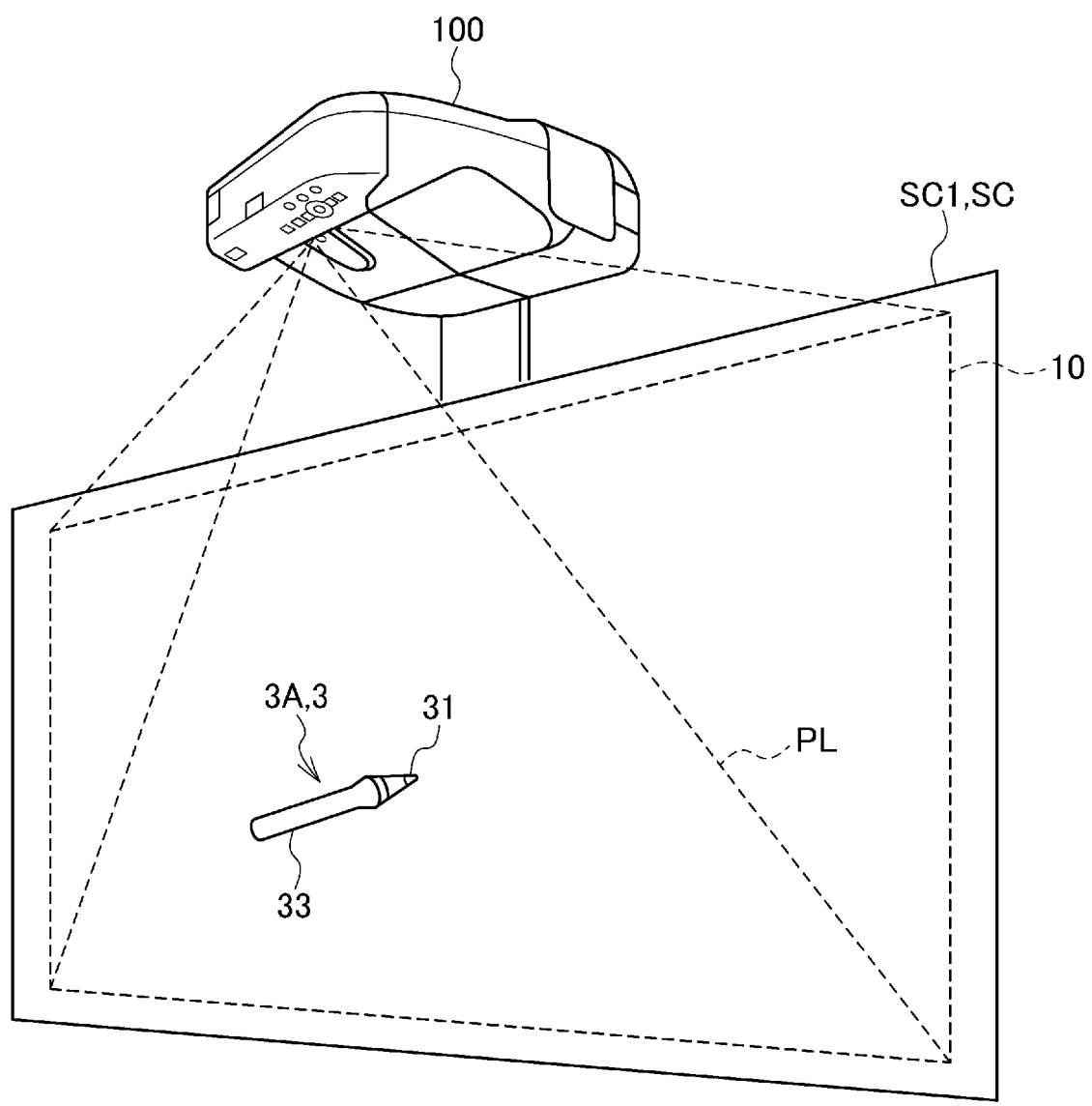
FIG. 2 is a perspective view showing an example of a first projector, a pointer, and a screen.

FIG. 2 is a perspective view showing an example of the first projector 100, a pointer 3A, and the screen SC1.

The first projector 100 to the fifth projector 500 have substantially the same configuration. Therefore, in the following explanation, the configuration of the first projector 100 is explained with reference to FIGS. 2 and 3. Explanation is omitted about the configurations of the second projector 200 to the fifth projector 500.

The first projector 100 generates a drawn image such as a character or a figure based on an input from the pointer 3A. The second projector 200 generates a drawn image such as a character or a figure based on an input from a pointer 3B.

The pointer 3A corresponds to an example of the "second pointer." The pointer 3B corresponds to an example of the "first pointer." In the following explanation, the pointer 3A and the pointer 3B are collectively referred to as pointer 3.

Each of the first projector 100 and the second projector 200 is an interactive projector. Each of the third projector 300 to the fifth projector 500 is a noninteractive projector. "Interactive" indicates that the projector has a pen drawing function by the pointer 3. "Noninteractive" indicates that the projector does not have the pen drawing function by a pointer. In this embodiment, the pen drawing function is a function of using a pen-type pointer as the pointer 3 and the projector detecting the position of the pointer 3 and generating a drawn image such as a character or a figure corresponding to a track of the position of the pointer 3. A drawing function of using a finger of the user as the pointer 3 and generating a drawn image such as a character or a figure corresponding to a track of the position of the finger of the user may be included in the pen drawing function.

When the user brings the pointer 3A into contact with the screen SC1 and moves the pointer 3A, the first projector 100 detects the position of the pointer 3A with respect to the screen SC1 and generates a drawn image such as a character or a figure corresponding to a track of the position of the pointer 3A.

In this embodiment, the pointer 3A is a pen-type pointer that the user holds and uses. The pointer 3A includes a tip section 31 capable of emitting light and a shaft section 33 gripped by the user. A light source such as an LED (Light Emitting Diode) that emits near infrared light is mounted on the tip end portion 31. The pointer 3A detects contact of the tip section 31 with the screen SC1. The light source emits light at a predetermined light emission interval in the tip section 31.

In this embodiment, the pointer 3 is the pen-type pointer. However, for example, a finger of the user can also be used as the pointer 3.

The first projector 100 is a so-called short-focus projector and is fixed to a wall surface above the screen SC1, which is a display surface. A setting method for the first projector 100 is not limited to wall hanging setting shown in FIG. 1 and may be flat setting for setting the first projector 100 flat on a desk, a table, a floor, or the like or ceiling-suspended setting for suspending the first projector 100 from a ceiling.

The screen SC1 is a flat plate or a curtain fixed to a wall or erected on a floor surface.

In this embodiment, the display surface including the "first display surface" and the "second display surface" is the screen SC. However, the display surface is not limited to the screen SC. For example, the wall surface itself can also be used as a screen.

The first projector 100 generates image light PL, which is an optical image, and projects the generated image light PL onto the screen SC1. An image based on the image light PL is formed on the screen SC1. A range of the screen SC1 in which the first projector 100 is capable of projecting the image light PL is referred to as projection region 10.

Figure 3:
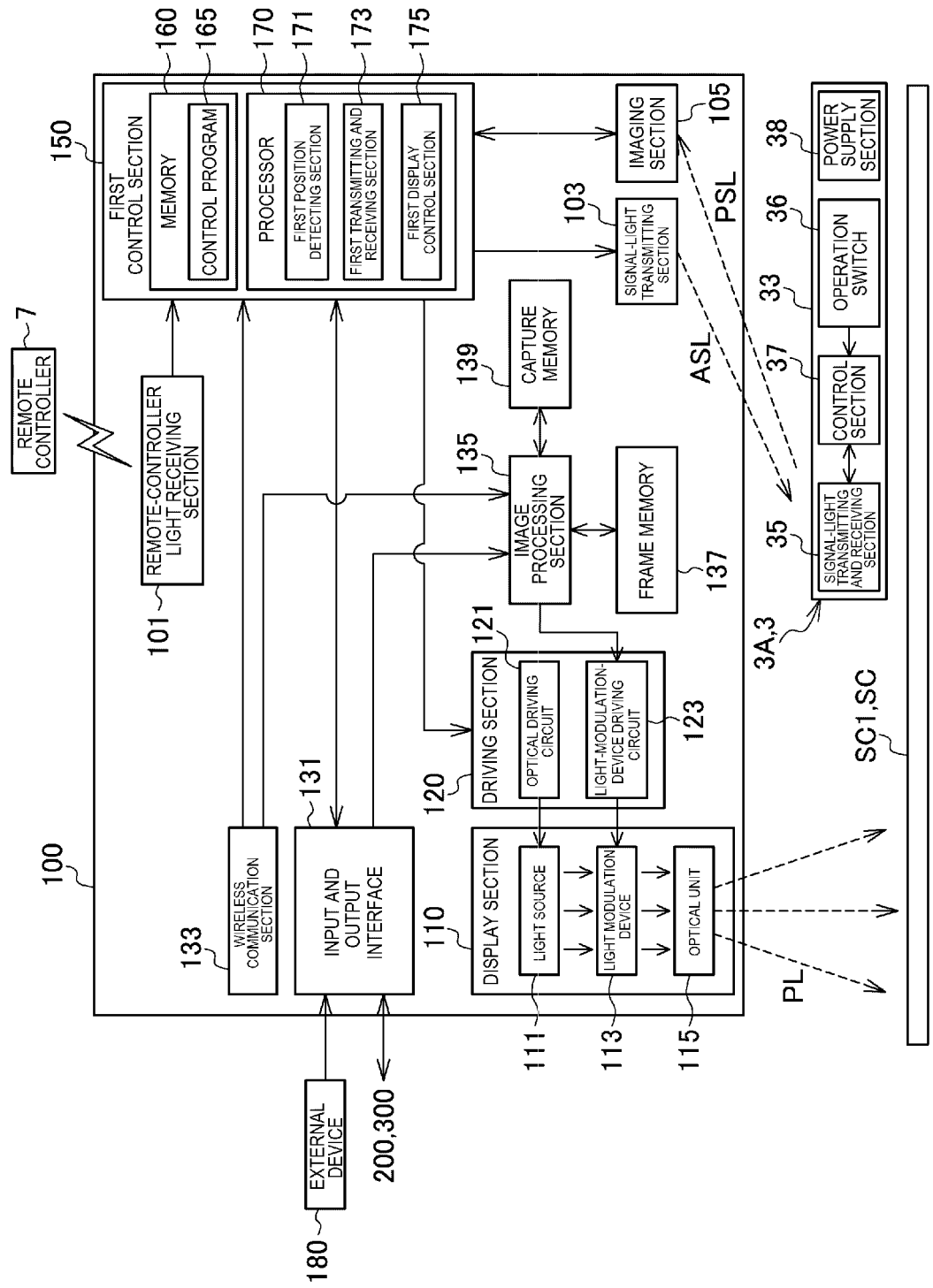
FIG. 3 is a block diagram showing an example of the configurations of the projector and the pointer.

The first projector 100 includes an imaging section 105 shown in FIG. 3. The imaging section 105 images a range including the screen SC1 from obliquely above, images at least the range including the screen SC1, and generates imaging data. The first projector 100 causes the imaging section 105 to execute imaging according to light emission timing of the pointer 3A. Then, an image of the pointer 3A that is emitting light is included in the imaging data. The first projector 100 analyzes the imaging data and detects a pointed position of the pointer 3A. The pointed position is a position pointed by the pointer 3A and corresponds to the position of the tip section 31.

1-3. Detailed Configurations of the Projector and the Pointer

FIG. 3 is a block diagram showing the configurations of the pointer 3A and the first projector 100.

First, the configuration of the pointer 3A is explained. The pointer 3A includes a signal-light transmitting and receiving section 35, an operation switch 36, a control section 37, and a power supply section 38. These sections are housed in the shaft section 33.

The signal-light transmitting and receiving section 35 includes a light source such as an infrared LED and a light receiving element that receives device signal light ASL, which is an infrared signal transmitted by the first projector 100. The signal-light transmitting and receiving section 35 lights and extinguishes the light source according to control by the control section 37 and causes the light source in a predetermined light emission pattern.

The operation switch 36 is incorporated in the tip section 31 of the pointer 3A and changes to an ON state when being pressed.

The pointer 3A is used in a state in which the user grips the bar-like shaft section 33 with a hand and the tip section 31 is in contact with the screen SC1. When the tip section 31 of the pointer 3A comes into contact with a wall, the screen SC1, or the like, the operation switch 36 changes to the ON state.

The control section 37 is coupled to the signal-light transmitting and receiving section 35 and the operation switch 36 and detects ON and OFF of the operation switch 36. According to ON and OFF of the operation switch 36, the control section 37 changes timing when the light source of the signal-light transmitting and receiving section 35 is lit and changes a lighting pattern.

In other words, when the operation switch 36 is on, the signal-light transmitting and receiving section 35 lights the light source in a lighting pattern different from a lighting pattern of the light source at the time when the operation switch 36 is off.

The first projector 100 detects the position of the tip section 31 based on pointer signal light PSL, which is an infrared signal emitted by the pointer 3A. The first projector 100 determines, based on a lighting pattern of the pointer signal light PSL emitted by the pointer 3A, whether the operation switch 36 is on.

The power supply section 38 includes a dry cell or a secondary battery as a power supply and supplies electric power to the control section 37, the signal-light transmitting and receiving section 35, and the operation switch 36. A power switch for turning on and off power supply from the power supply section 38 is mounted on the pointer 3A.

The configuration of the first projector 100 is explained.

The first projector 100 includes, as main components, an operation section, an image projection system, an image processing system, and a first control section 150. The image projection system generates the image light PL based on image data processed by the image processing system. The image light PL corresponds to an image indicated by the image data.

The image projection system projects the generated image light PL onto the screen SC1. The image processing system processes the image data.

The first projector 100 includes, as the operation section that receives operation of the user, a remote-controller light receiving section 101, a signal-light transmitting section 103, and an imaging section 105.

The remote-controller light receiving section 101 receives an infrared signal transmitted from a remote controller 7. The remote-controller light receiving section 101 generates an operation signal corresponding to the received infrared signal and outputs the generated operation signal to the first control section 150. The operation signal is a signal corresponding to a switch of the remote controller 7 operated by the user.

The signal-light transmitting section 103 outputs the device signal light ASL. The device signal light ASL is a signal for synchronizing light emission timing of the pointer 3A with imaging timing of the imaging section 105. The device signal light ASL is a signal of infrared light receivable by the signal-light transmitting and receiving section 35 of the pointer 3A. When the first projector 100 is operating, the signal-light transmitting section 103 periodically transmits the device signal light ASL.

The device signal light ASL is, for example, a control signal for instructing the pointer 3A about timing for transmitting the pointer signal light PSL. The pointer signal light PSL is infrared light having a predetermined light emission pattern. The pointer 3A transmits the pointer signal light PSL in the predetermined light emission pattern in synchronization with timing when the device signal light ASL is received. The light emission pattern of the pointer signal light PSL is a light emission pattern that varies according to ON and OFF of the operation switch 36.

The imaging section 105 includes an imaging element such as a CMOS (Complementary Metal-Oxide-Semiconductor) or a CCD (Charge Coupled Device) that receives the pointer signal light PSL emitted by the tip section 31 of the pointer 3A, an optical system that forms an image on the imaging element, and a data processing circuit that generates imaging data from a light receiving state of the pointer signal light PSL by the imaging element.

The imaging section 105 images the range including the screen SC1 at every fixed time interval and generates imaging data according to control by the first control section 150. The imaging section 105 outputs the generated imaging data to the first control section 150. The first control section 150 causes a memory 160 explained below to temporarily store the imaging data input from the imaging section 105.

The image projection system includes a display section 110 and a driving section 120 that drives the display section 110. The display section 110 includes a light source 111, a light modulation device 113, and an optical unit 115. The driving section 120 includes a light-source driving circuit 121 and a light-modulation-device driving circuit 123.

A lamp light source such as a halogen lamp, a xenon lamp, or an ultra-high pressure mercury lamp is used as the light source 111. A solid-state light source such as an LED or a laser light source may be used as the light source 111.

The light-source driving circuit 121 is coupled to the light source 111. The light-source driving circuit 121 is coupled to the light source 111 and the first control section 150. The light-source driving circuit 121 supplies a driving current to the light source 111 and lights and extinguishes the light source 111 according to the control by the first control section 150.

The light modulation device 113 includes a light modulation element that modulates light emitted by the light source 111 and generates the image light PL. The light modulation device 113 emits the image light PL modulated by the light modulation element to the optical unit 115. As the light modulation element, for example, a transmission-type liquid crystal light valve, a reflection-type liquid crystal light valve, or a digital mirror device can be used.

The light-modulation-device driving circuit 123 is coupled to the light modulation device 113. The light-modulation-device driving circuit 123 is coupled to the first control section 150 and the light modulation device 113. The light-modulation-device driving circuit 123 drives the light modulation device 113 according to the control by the first control section 150 and draws an image on the light modulation element in frame units. For example, when the light modulation device 113 is configured by a liquid crystal light valve, the light-modulation-device driving circuit 123 is configured by a driver circuit that drives liquid crystal.

The optical unit 115 includes optical elements such as a lens and a mirror and projects the image light PL modulated by the light modulation device 113 toward the screen SC1. Consequently, an image based on the image light PL is formed on the screen SC1.

The image processing system of the first projector 100 is explained.

The first projector 100 includes, as the image processing system, an input and output interface 131, a wireless communication section 133, an image processing section 135, a frame memory 137, and a capture memory 139.

The input and output interface 131 is a coupling section for coupling to the second projector 200, the third projector 300, and an external device 180 and includes a plurality of interfaces. The input and output interface 131 can be coupled to a plurality of external devices 180 by the plurality of interfaces.

An interface for coupling to the external device 180 may be a digital interface such as a DVI (Digital Visual Interface), an HDMI (registered trademark: High-Definition Multimedia Interface), a Display Port, or an HDBaseT (registered trademark).

The plurality of interfaces may be an analog interface such as a VGA (Video Graphics Array), a D terminal, or an S terminal. The plurality of interfaces may be a communication interface such as USB (Universal Serial Bus), Ethernet (registered trademark), or IEEE1394.

The interface for coupling to the external device 180 includes a connector that couples a cable and an interface circuit that electrically processes an image signal received via the cable. The interface circuit receives an image signal and extracts image data and a synchronization signal included in the received image signal. The image data included in the image signal may be image data of a moving image or may be image data of a still image. The interface circuit outputs the extracted image data and the extracted synchronization signal to the image processing section 135.

The interface circuit outputs the extracted synchronization signal to the first control section 150. The image processing section 135 processes one frame of the image data in synchronization with the input synchronization signal. The first control section 150 controls the sections of the first projector 100 in synchronization with the input synchronization signal. One frame indicates a period in which an image for one screen is displayed. One frame of the image data corresponds to image data displayed in a vertical scanning period specified by a vertical synchronization signal included in the synchronization signal.

An interface for coupling to the second projector 200 and the third projector 300 is a communication interface such as Ethernet (registered trademark) or IEEE1394.

The wireless communication section 133 is a communication module including an antenna, an RF (Radio Frequency) circuit, and a baseband circuit. The wireless communication section 133 executes wireless communication such as a Wireless LAN including Bluetooth (registered trademark) and Wi-Fi (registered trademark) and NFC (Near Field Communication).

The wireless communication section 133 demodulates packet data from a radio wave received by the antenna and extracts image data and a synchronization signal from the demodulated packet data. The wireless communication section 133 outputs the extracted image data and the extracted synchronization signal to the image processing section 135 and outputs the synchronization signal to the first control section 150.

The frame memory 137 is coupled to the image processing section 135. The image processing section 135 develops the input image data in the frame memory 137. The frame memory 137 includes a plurality of banks. The banks have storage capacity for enabling writing of image data for one frame. The frame memory 137 is configured by, for example, an SDRAM (Synchronous Dynamic Random Access Memory) or a DDR (Double-Data-Rate Synchronous Dynamic Random Access Memory).

For example, the frame memory 137 includes a plurality of banks corresponding to the plurality of interfaces included in the input and output interface 131 and the wireless communication section 133. The image processing section 135 causes any one of the plurality of banks of the frame memory 137 to store image data input from the plurality of interfaces and the wireless communication section 133.

The capture memory 139 is coupled to the image processing section 135. Like the frame memory 137, the capture memory 139 is configured by an SDRAM, a DDR, or the like. The image processing section 135 causes, according to the control by the first control section 150, the capture memory 139 to store, as capture data, the image data developed in the frame memory 137. Operation for causing the capture memory 139 to store the image data developed in the frame memory 137 is referred to as "capture." An image that the first projector 100 displays on the screen SC1 based on the capture data is referred to as "capture image."

The image data developed in the frame memory 137 is image data based on an image signal input from the external device 180 and is data displayed on the screen SC1 by the display section 110. For example, when the first projector 100 is synchronized with a 60 Hz vertical synchronization signal, the image data developed in the frame memory 137 is rewritten once in 16.7 milliseconds, which is the inverse of 60 Hz. By causing the capture memory 139 to store, as the capture data, the image data developed in the frame memory 137, even after the input of the image signal from the external device 180 is stopped, the first projector 100 can independently display the image data.

The image processing section 135 performs image processing on the image data developed in the frame memory 137. The image processing performed by the image processing section 135 includes, for example, resolution conversion processing or resize processing, correction of distortion aberration, shape correction processing, digital zoom processing, and adjustment of a tint and luminance of an image. The image processing section 135 executes processing instructed by the first control section 150 and performs, according to necessity, processing using parameters input from the first control section 150. The image processing section 135 is naturally capable of executing, in combination, a plurality of kinds of image processing among the kinds of processing described above. The image processing section 135 reads out, from the frame memory 137, image data developed in a bank selected by the first control section 150 and outputs the image data to the light-modulation-device driving circuit 123.

The image processing section 135, the frame memory 137, and the capture memory 139 are configured by, for example, an integrated circuit. The integrated circuit includes an LSI, an ASIC (Application Specific Integrated Circuit), a PLD (Programmable Logic Device), an FPGA (Field-Programmable Gate Array), and an SoC (System-on-a-Chip). An analog circuit may be included in a part of the configuration of the integrated circuit. The first control section 150 and the integrated circuit may be combined.

The configuration of the first control section 150 is explained. The first control section 150 is a computer device including a memory 160 and a processor 170. The memory 160 includes a volatile memory such as a RAM (Random Access Memory) and a nonvolatile memory such as a ROM (Read Only Memory) or a flash memory. The memory 160 may include a HDD (Hard Disk Drive).

The memory 160 stores a control program 165 to be executed by the processor 170. Various image data are stored in the memory 160.

Calibration data is stored in the memory 160. The calibration data is data that associates imaging data of the imaging section 105 and the projection region 10 of the screen SC. More specifically, the calibration data is data that associates a coordinate set in the imaging data and a coordinate set in the frame memory 137.

The processor 170 is an arithmetic processing device configured by a CPU (Central Processing Unit) and a microcomputer. The processor 170 executes the control program 165 and controls the sections of the first projector 100. The processor 170 may be configured by a single processor or can also be configured by a plurality of processors. The processor 170 may be configured by an SoC integrated with a part of or the entire memory 160 or other circuits. The processor 170 may be configured by a combination of a CPU that executes programs and a DSP (Digital Signal Processor) that executes predetermined arithmetic processing. Further, all functions of the processor 170 may be implemented in hardware or may be configured using a programmable device.

1-4. Functional Configuration of the Control Section

The first control section 150 includes, as functional blocks, a first position detecting section 171, a first transmitting and receiving section 173, and a first display control section 175. These functional blocks indicate functions realized by the processor 170 executing the control program 165.

The first position detecting section 171 detects a pointed position of the pointer 3A and generates track information indicating a track of the pointed position of the pointer 3A. The track information in the second projector 200 corresponds to "first information."

Specifically, the first position detecting section 171 causes the signal-light transmitting section 103 to transmit the device signal light ASL at a fixed interval. The first position detecting section 171 causes the imaging section 105 to execute imaging in synchronization with transmission timing of the device signal light ASL. The imaging section 105 images the range including the screen SC1, generates imaging data, and outputs the generated imaging data to the first control section 150. The imaging data is temporarily stored in the memory 160.

The first position detecting section 171 acquires the imaging data from the memory 160, analyzes the acquired imaging data, and detects the pointer signal light PSL. The first position detecting section 171 converts a coordinate value indicating the position of the detected pointer signal light PSL into a coordinate value in the frame memory 137 according to calibration data. The first position detecting section 171 specifies a light emission pattern of the pointer signal light PSL based on imaging timing of the imaging data in which the pointer signal light PSL is detected and determines whether the pointer 3A is in contact with the screen SC.

The first transmitting and receiving section 173 transmits and receives various kinds of information between the first transmitting and receiving section 173 and the other projectors. The first transmitting and receiving section 173 corresponds to an example of the "first transmitting section." The first transmitting and receiving section 173 is explained in detail with reference to FIG. 4.

The first display control section 175 displays various images on the screen SC1.

Specifically, the first display control section 175 generates image data and causes the image processing section 135 to execute image processing for the generated image data. The first display control section 175 controls the driving section 120 and causes the display section 110 to generate the image light PL and project the generated image light PL onto the screen SC1.

The first display control section 175 is explained in detail with reference to FIG. 4.

1-5. Configuration and Operation of the First Control Section to a Third Control Section FIG. 4 is a block diagram showing an example of the configurations of the first control section 150, a second control section 250, and a third control section 350.

As explained with reference to FIG. 3, the first control section 150 of the first projector 100 includes the first position detecting section 171, the first transmitting and receiving section 173, and the first display control section 175.

The first projector 100 receives an input from the pointer 3A and generates a drawn image in some cases and does not receive the input from the pointer 3A in other cases. In the former case, since the first position detecting section 171 is unnecessary, in FIG. 4, the first position detecting section 171 is indicated by a broken line.

Figure 4:
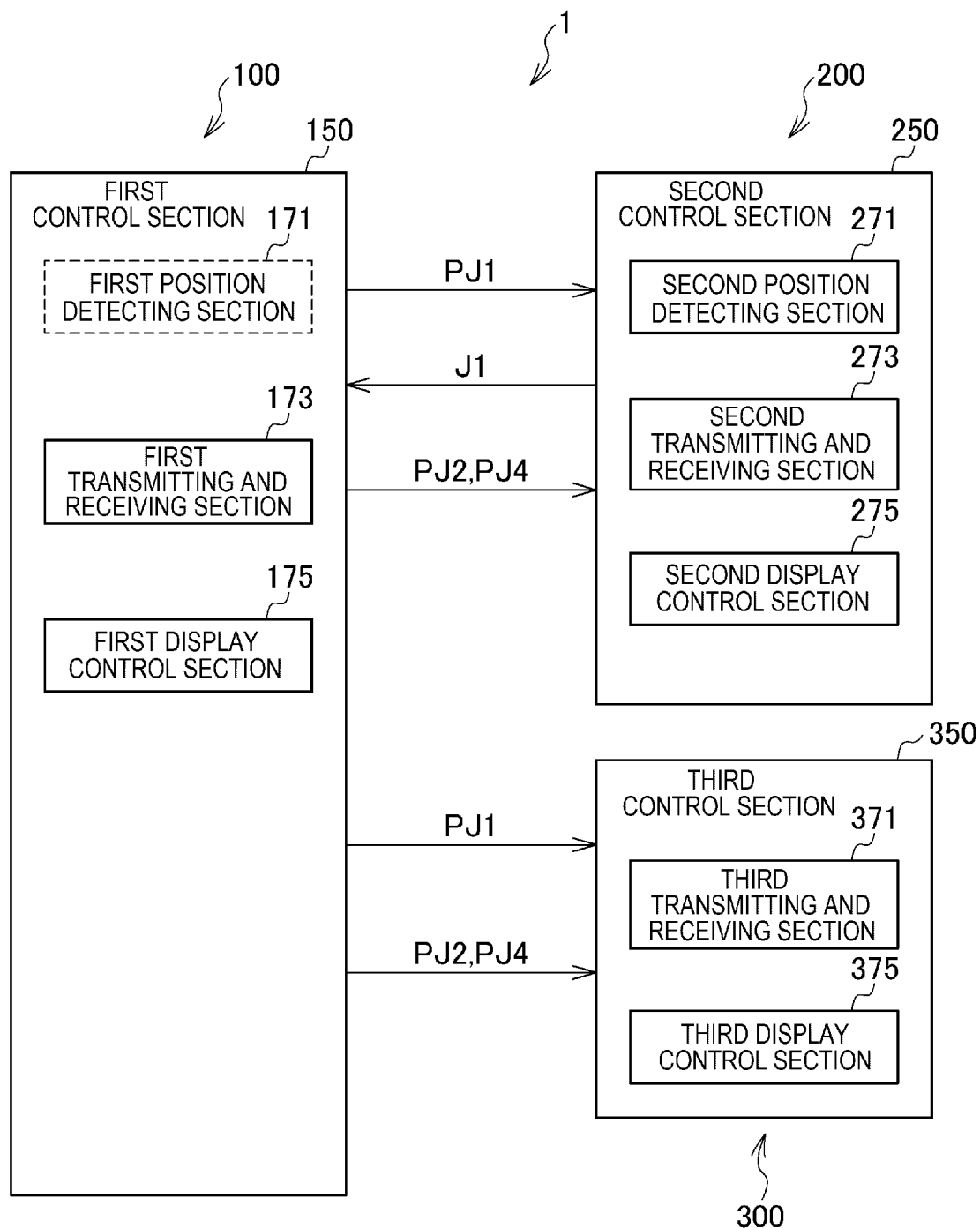
FIG. 4 is a block diagram showing an example of the configurations of a first control section to a third control section.

As shown in FIG. 4, the second projector 200 includes the second control section 250. The second control section 250 includes a second position detecting section 271, a second transmitting and receiving section 273, and a second display control section 275. The second position detecting section 271 corresponds to an example of the "position detecting section." The second transmitting and receiving section 273 corresponds to an example of the "second transmitting section."

The second projector 200 generates a drawn image such as a character or a figure based on an input from the pointer 3B. The second projector 200 displays an image on the screen SC2.

The third projector 300 includes the third control section 350. The third control section 350 includes the second transmitting and receiving section 273 and the second display control section 275.

The third projector 300 displays an image on the screen SC3.

As explained with reference to FIG. 2, the third projector 300 is a non-interactive projector that does not include, in the third control section 350, a position detecting section that detects a pointed position of the pointer 3 and does not have a pen drawing function.

1-5-1. When the First Projector Does Not Receive an Input From the Pointer

First, functions performed by each of the first control section 150, the second control section 250, and the third control section 350 when the first projector 100 does not receive an input from the pointer 3A are explained.

In the first projector 100, the first control section 150 receives an image signal from the external device 180 and generates first image information PJ1. The first transmitting and receiving section 173 transmits the first image information PJ1 to the second projector 200 and the third projector 300. The first display control section 175 displays a first image P1 corresponding to the first image information PJ1 on the screen SC1.

In the second projector 200, the second transmitting and receiving section 273 of the second control section 250 receives the first image information PJ1 from the first projector 100. The second display control section 275 displays the first image P1 corresponding to the first image information PJ1 on the screen SC2.

The second position detecting section 271 detects a pointed position of the pointer 3B and generates first information J1 indicating a track of the pointed position of the pointer 3B. The second transmitting and receiving section 273 transmits the first information J1 to the first projector 100.

In the first projector 100, the first transmitting and receiving section 173 of the first control section 150 receives the first information J1 from the second projector 200. The first control section 150 generates a first drawing object BJ1 based on the first information J1 and superimposes the first drawing object BJ1 and the first image P1 to thereby generate second image information PJ2. The first display control section 175 displays a second image P2 corresponding to the second image information PJ2 on the screen SC1. The first transmitting and receiving section 173 transmits the second image information PJ2 to each of the second projector 200 and the third projector 300.

In the second projector 200, the second transmitting and receiving section 273 of the second control section 250 receives the second image information PJ2 from the first projector 100. The second display control section 275 displays the second image P2 corresponding to the second image information PJ2 on the screen SC2.

In the third projector 300, the third transmitting and receiving section 373 of the third control section 350 receives the second image information PJ2 from the first projector 100. A third display control section 375 displays the second image P2 corresponding to the second image information PJ2 on the screen SC3.

In this way, the second image P2 is displayed on the screen SC by each of the first projector 100, the second projector 200, and the third projector 300. The second image P2 includes the first drawing object BJ1 corresponding to the track of the pointed position of the pointer 3B detected by the second position detecting section 271 in the second projector 200.

1-5-2. When the First Projector Receives an Input From the Pointer

Functions performed by each of the first control section 150, the second control section 250, and the third control section 350 when the first projector 100 receives an input from the pointer 3A are explained.

In the first projector 100, the first control section 150 receives an image signal from the external device 180 and generates the first image information PJ1. The first transmitting and receiving section 173 transmits the first image information PJ1 to the second projector 200 and the third projector 300. The first display control section 175 displays the first image P1 corresponding to the first image information PJ1 on the screen SC1.

The first position detecting section 171 detects a pointed position of the pointer 3A and generates second information J2 indicating a track of the pointed position of the pointer 3A. The first control section 150 generates a third drawing object BJ3 based on the second information J2.

In the second projector 200, the second transmitting and receiving section 273 of the second control section 250 receives the first image information PJ1 from the first projector 100. The second display control section 275 displays the first image P1 corresponding to the first image information PJ1 on the screen SC2.

The second position detecting section 271 detects a pointed position of the pointer 3B and generates the first information J1 indicating a track of the pointed position of the pointer 3B. The second transmitting and receiving section 273 transmits the first information J1 to the first projector 100.

In the first projector 100, the first transmitting and receiving section 173 of the first control section 150 receives the first information J1 from the second projector 200. The first control section 150 generates the first drawing object BJ1 based on the first information J1 and superimposes the first drawing object BJ1, the third drawing object BJ3, and the first image P1 to thereby generate fourth image information PJ4. The first display control section 175 displays a fourth image P4 corresponding to the fourth image information PJ4 on the screen SC1. The first transmitting and receiving section 173 transmits the fourth image information PJ4 to each of the second projector 200 and the third projector 300.

In the second projector 200, the second transmitting and receiving section 273 of the second control section 250 receives the fourth image information PJ4 from the first projector 100. The second display control section 275 displays the fourth image P4 corresponding to the fourth image information PJ4 on the screen SC2.

In the third projector 300, the third transmitting and receiving section 373 of the third control section 350 receives the fourth image information PJ4 from the first projector 100. The third display control section 375 displays the fourth image P4 corresponding to the fourth image information PJ4 on the screen SC3.

In this way, the fourth image P4 is displayed on the screen SC by each of the first projector 100, the second projector 200, and the third projector 300. The fourth image P4 includes the first drawing object BJ1 and the third drawing object BJ3. The first drawing object BJ1 corresponds to the track of the pointed position of the pointer 3B detected by the second position detecting section 271 in the second projector 200. The third drawing object BJ3 corresponds to the track of the pointed position of the pointer 3A detected by the first position detecting section 171 in the first projector 100.

1-5-3. About Transmission Restriction for the Second Projector and the Third Projector In this embodiment, the first projector 100 is set in a server device and each of the second projector 200 and the third projector 300 is set in a client device.

In other word, the first projector 100 executes a server function. Specifically, the first projector 100 transmits, to the second projector 200 and the third projector 300, image information such as the first image information PJ1 and the second image information PJ2 generated by the first projector 100.

The second projector 200 is prohibited from transmitting the first image information PJ1 and the second image information PJ2 to the fourth projector 400.

Specifically, the second control section 250 of the second projector 200 is prohibited from displaying a menu for executing the server function, whereby the second control section 250 of the second projector 200 prevents the user from selecting the menu for executing the server function and then the second control section 250 of the second projector 200 is prohibited from transmitting the first image information PJ1 and the second image information PJ2 to the fourth projector 400.

The third projector 300 is prohibited from transmitting the first image information PJ1 and the second image information PJ2 to the fifth projector 500.

Specifically, the third control section 350 of the third projector 300 is prohibited from displaying the menu for executing the server function, whereby the third control section 350 of the third projector 300 prevents the user from selecting the menu for executing the server function and then the third control section 350 of the third projector 300 is prohibited from transmitting the first image information PJ1 and the second image information PJ2 to the fifth projector 500.

The server function indicates, for example, when another device such as the fourth projector 400 is represented as a client device and an own device such as the second projector 200 is represented as a server device, a function executed by the own device functioning as the server device. The server function indicates, for example, when another device such as the fifth projector 500 is represented as a client device and an own device such as the third projector 300 is represented as a server device, a function executed by the own device functioning as the server device.

The server function includes, for example, a function of transmitting information of the server device such as the first image information PJ1 and the second image information PJ2 to the client device.

1-6. Transition of Images Displayed on the Screens

Figure 5:
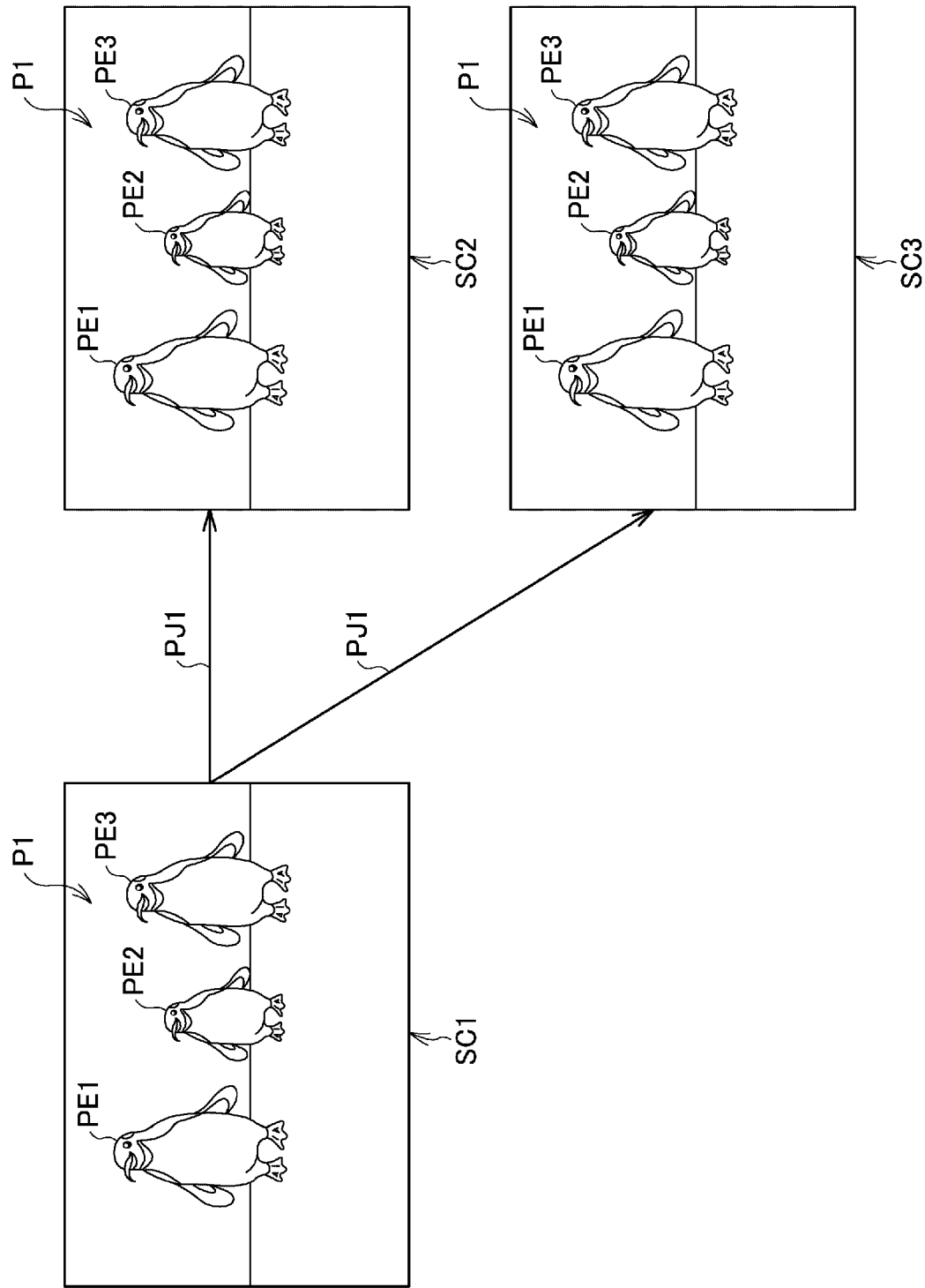
FIG. 5 is an image diagram showing an example of the operations of the first control section to the third control section.
Figure 6:
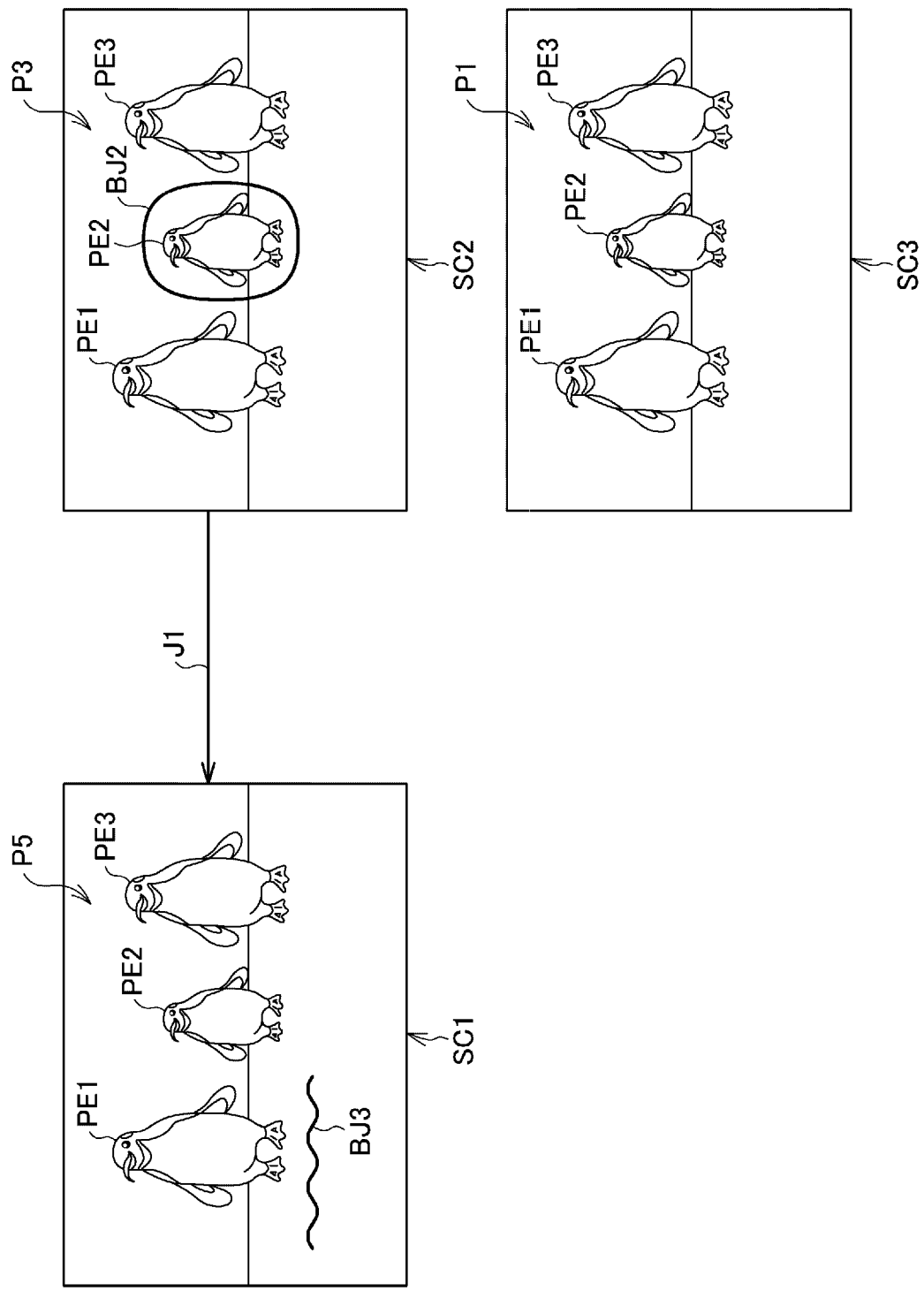
FIG. 6 is an image diagram showing an example of the operations of the first control section to the third control section.
Figure 7:
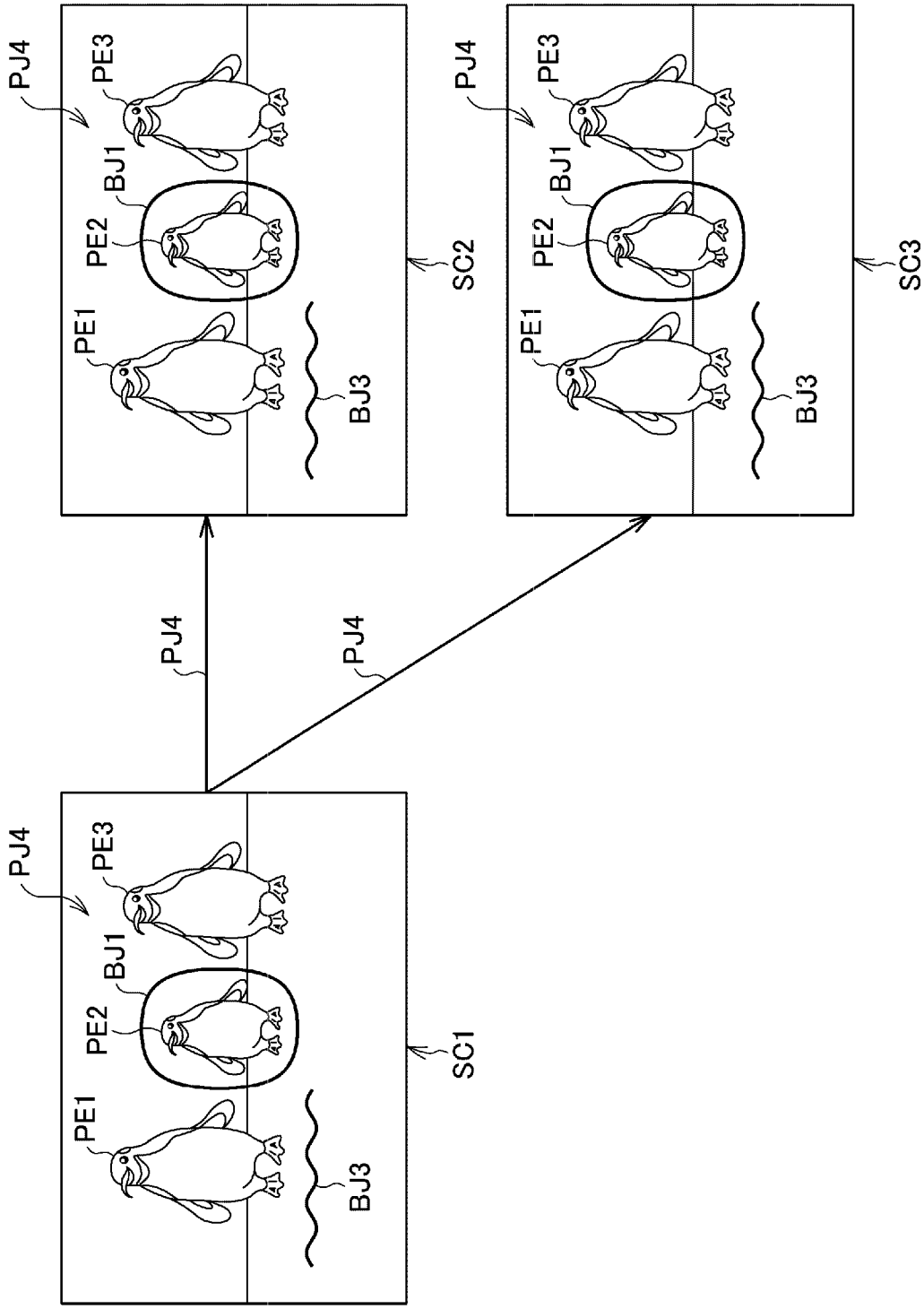
FIG. 7 is an image diagram showing an example of the operations of the first control section to the third control section.

Each of FIGS. 5 to 7 is an image diagram showing an example of the operation of each of the first control section 150, the second control section 250, and the third control section 350. In FIGS. 5 to 7, the first projector receives an input from the pointer 3A.

As shown in FIG. 5, the first control section 150 receives an image signal from the external device 180 and generates the first image information PJ1. The first transmitting and receiving section 173 transmits the first image information PJ1 to the second projector 200 and the third projector 300. The first display control section 175 displays the first image P1 corresponding to the first image information PJ1 on the screen SC1.

The first image P1 is an image in which a penguin image PE1, a penguin image PE2, and a penguin image PE3 are arrayed along the left-right direction.

The second transmitting and receiving section 273 of the second control section 250 receives the first image information PJ1 from the first projector 100. The second display control section 275 displays the first image P1 corresponding to the first image information PJ1 on the screen SC2.

The third transmitting and receiving section 373 of the third control section 350 receives the first image information PJ1 from the first projector 100. The third display control section 375 displays the first image P1 corresponding to the first image information PJ1 on the screen SC3.

Subsequently, as shown in FIG. 6, the first position detecting section 171 detects a pointed position of the pointer 3A and generates the second information J2 indicating a track of the pointed position of the pointer 3A. The first control section 150 generates the third drawing object BJ3 based on the second information J2. The first control section 150 superimposes the third drawing object BJ3 and the first image P1 to thereby generate fifth image information PJ5. The first display control section 175 displays a fifth image P5 corresponding to the fifth image information PJ5 on the screen SC1. The third drawing object BJ3 shows a wavy line drawn on the lower side of the penguin image PE1 of the first image P1.

The second position detecting section 271 of the second control section 250 detects a pointed position of the pointer 3B and generates the first information J1 indicating the pointed position of the pointer 3B. The second transmitting and receiving section 273 transmits the first information J1 to the first projector 100.

The second control section 250 generates a second drawing object BJ2 based on the first information J1 and superimposes the second drawing object BJ2 and the first image P1 to thereby generate third image information PJ3. The second display control section 275 displays a third image P3 corresponding to the third image information PJ3 on the screen SC2. The second drawing object BJ2 shows an elliptical shape surrounding the penguin image PE2 of the first image P1.

Subsequently, as shown in FIG. 7, the first transmitting and receiving section 173 receives the first information J1. The first control section 150 generates the first drawing object BJ1 based on the first information J1. The first drawing object BJ1 is the same object as the second drawing object BJ2 and shows an elliptical shape surrounding the penguin image PE2 of the first image P1. The first control section 150 superimposes the first drawing object BJ1, the third drawing object BJ3, and the first image P1 to thereby generate the fourth image information PJ4. The first display control section 175 displays the fourth image P4 corresponding to the fourth image information PJ4 on the screen SC1.

The first transmitting and receiving section 173 transmits the fourth image information PJ4 to each of the second projector 200 and the third projector 300. The second transmitting and receiving section 273 receives the fourth image information PJ4. The second display control section 275 displays the fourth image P4 corresponding to the fourth image information PJ4 on the screen SC2. The third transmitting and receiving section 373 receives the fourth image information PJ4. The third display control section 375 displays the fourth image P4 corresponding to the fourth image information PJ4 on the screen SC3.

1-7. Detection Range of the Position Detecting Section

Figure 8:
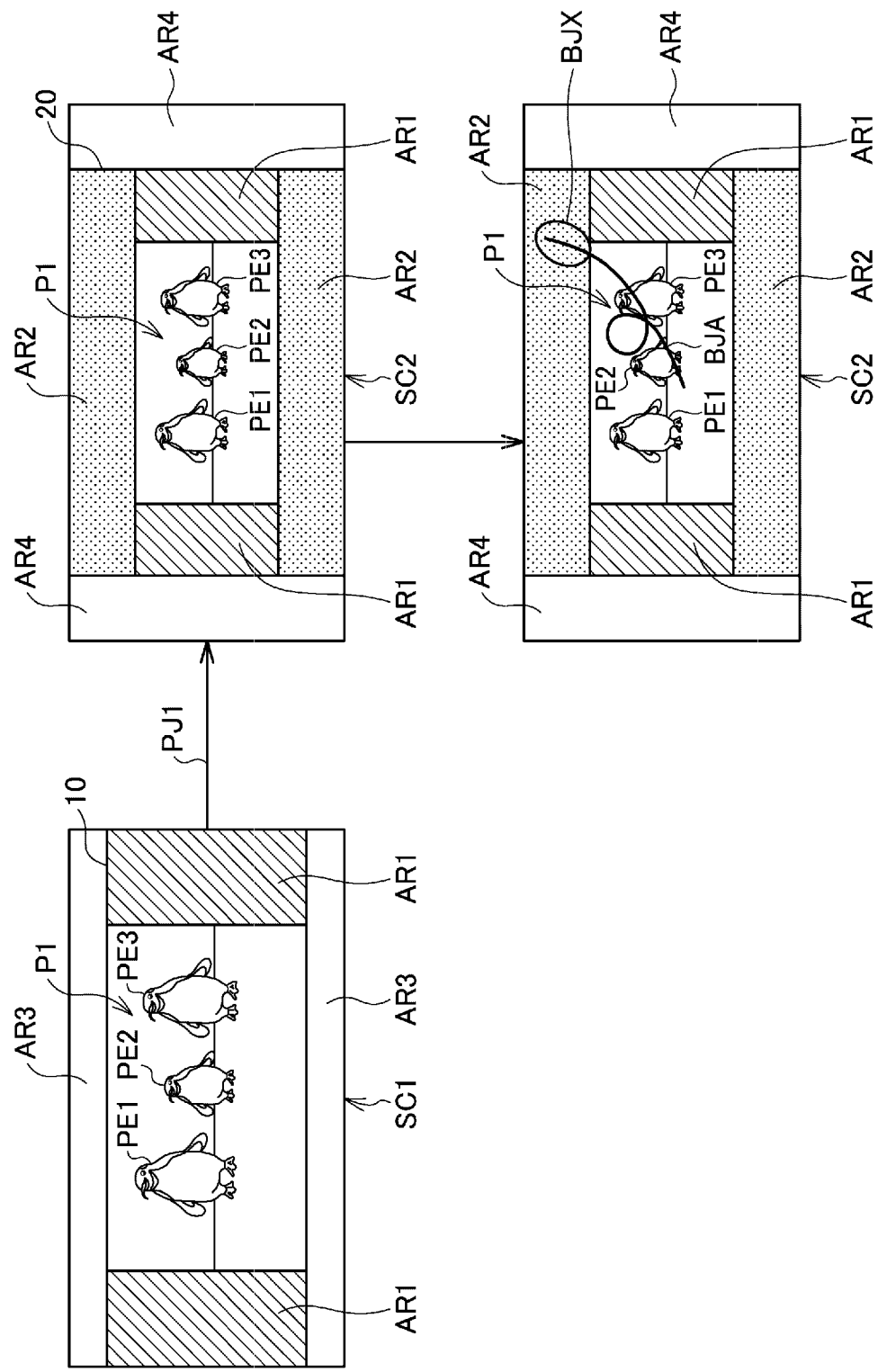
FIG. 8 is an image diagram showing an example of the operation performed by a second position detecting section when an aspect ratio is different.

FIG. 8 is an image diagram showing an example of the operation performed by the second position detecting section 271 when an aspect ratio of the first projector 100 and an aspect ratio of the second projector 200 are different.

An upper left figure of FIG. 8 shows a state in which the first projector 100 displays the first image P1 on the screen SC1. An aspect ratio of the first projector 100 is 16:6. In other words, an aspect ratio of the projection region 10 of the first projector 100 is 16:6. On the other hand, an aspect ratio of the first image P1 is 16:9.

The projection region 10 includes the first image P1 and a non-display region AR1. The non-display region AR1 indicates a region where the image light PL is not projected in the projection region 10.

The screen SC1 includes the projection region 10 and the non-projection region AR3. The non-projection region AR3 indicates a region on the outer side of the projection region 10.

An upper right figure of FIG. 8 shows a state in which the second projector 200 displays the first image P1 on the screen SC2.

An aspect ratio of the second projector 200 is 4:3. A projection region 20 indicates a range of the screen SC2 in which the second projector 200 is capable of projecting the image light PL. The projection region 20 includes the first image P1, the non-display region AR1, and a non-display region AR2. The non-display region AR2 indicates a region where the image light PL is not projected in the projection region 20.

The screen SC2 includes the projection region 20 and a non-projection region AR4. The non-projection region AR4 indicates a region on the outer side of the projection region 20.

A lower right figure of FIG. 8 shows an input of the pointer 3B received by the second position detecting section 271. An object BJA shown in FIG. 8 corresponds to a track of a pointed position of the pointer 3B. The object BJA extends from the lower side of the penguin image PE2 of the first image P1 toward the upper right and reaches the non-display region AR2.

Information indicating a pointed position of the pointer 3B corresponding an object BJX included in the non-display region AR2 is not detected by the second position detecting section 271.

Similarly, information indicating a pointed position of the pointer 3B corresponding to an object included in the non-display region AR1 is not detected by the second position detecting section 271.

In other words, the second position detecting section 271 detects a track of a pointed position of the pointer 3B with respect to a display region for the first image P1 in the screen SC2 and generates the first information J1.

2. Processing of the Control Section

Processing of the first control section 150, the second control section 250, and the third control section 350 is explained with reference to FIGS. 9 and 10.

Figure 9:
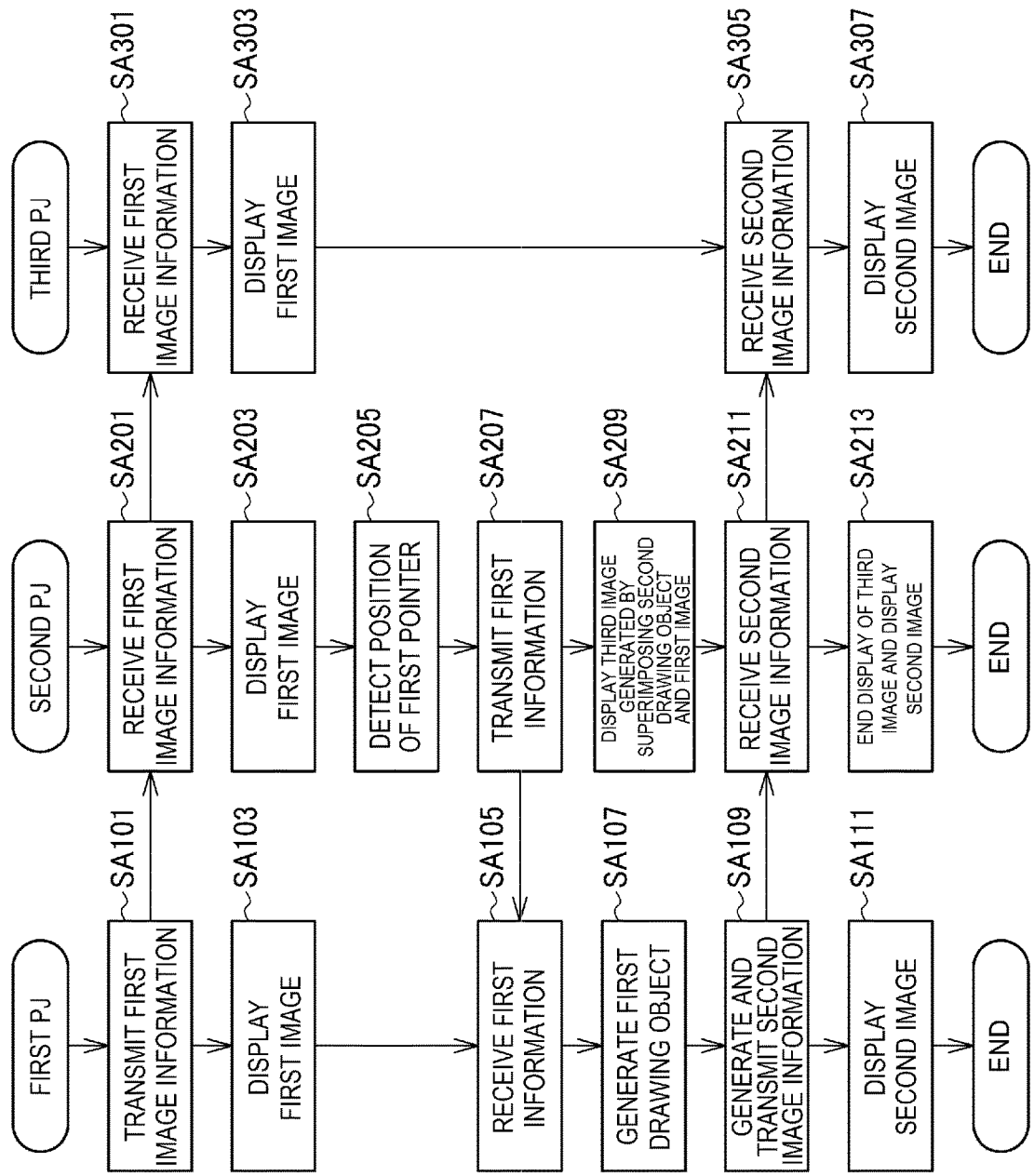
FIG. 9 is a flowchart showing an example of processing of the first control section to the third control section.

FIG. 9 shows processing performed by each of the first control section 150, the second control section 250, and the third control section 350 when the first projector 100 does not receive an input from the pointer 3A.

As shown in FIG. 9, the first control section 150 of the first projector 100 executes processing as explained below.

First, in step SA101, the first control section 150 receives an image information from the external device 180 and generates the first image information PJ1. The first transmitting and receiving section 173 transmits the first image information PJ1 to each of the second projector 200 and the third projector 300.

Subsequently, in step SA103, the first display control section 175 displays the first image P1 corresponding to the first image information PJ1 on the screen SC1.

Subsequently, in step SA105, the first transmitting and receiving section 173 receives the first information J1 from the second projector 200.

Subsequently, in step SA107, the first control section 150 generates the first drawing object BJ1 based on the first information J1.

Subsequently, in step SA109, the first control section 150 superimposes the first drawing object BJ1 and the first image P1 to thereby generate the second image information PJ2. The first transmitting and receiving section 173 transmits the second image information PJ2 to each of the second projector 200 and the third projector 300.

Subsequently, in step SA111, the first display control section 175 displays the second image P2 corresponding to the second image information PJ2 on the screen SC1. The processing ends.

The second control section 250 of the second projector 200 executes the processing as explained below.

First, in step SA201, the second transmitting and receiving section 273 receives the first image information PJ1 from the first projector 100.

Subsequently, in step SA203, the second display control section 275 displays the first image P1 corresponding to the first image information PJ1 on the screen SC2.

Subsequently, in step SA205, the second position detecting section 271 detects a pointed position of the pointer 3B (the first pointer) and generates the first information J1 indicating a track of the pointed position of the pointer 3B.

Subsequently, in step SA207, the second transmitting and receiving section 273 transmits the first information J1 to the first projector 100.

Subsequently, in step SA209, the second control section 250 generates the second drawing object BJ2 based on the first information J1 and superimposes the second drawing object BJ2 and the first image P1 to thereby generate the third image information PJ3. The second display control section 275 displays the third image P3 corresponding to the third image information PJ3 on the screen SC2.

Subsequently, in step SA211, the second transmitting and receiving section 273 receives the second image information PJ2 from the first projector 100.

Subsequently, in step SA213, after ending the display of the third image P3, the second display control section 275 displays the second image P2 corresponding to the second image information PJ2 on the screen SC2. The processing ends.

The third control section 350 of the third projector 300 executes the processing as explained below.

First, in step SA301, the third transmitting and receiving section 373 receives the first image information PJ1 from the first projector 100.

Subsequently, in step SA303, the third display control section 375 displays the first image P1 corresponding to the first image information PJ1 on the screen SC3.

Subsequently, in step SA305, the third transmitting and receiving section 373 receives the second image information PJ2 from the first projector 100.

Subsequently, in step SA307, the third display control section 375 displays the second image P2 corresponding to the second image information PJ2 on the screen SC3. The processing ends.

In this embodiment, when receiving the second image information PJ2 from the first projector 100, the second display control section 275 ends the display of the third image P3. However, the embodiments of the present disclosure are not limited to this. When a predetermined time has elapsed, the second display control section 275 may end the display of the third image P3 on the screen SC2.

Further, when the predetermined time has elapsed, the second display control section 275 may end the display of the third image P3 on the screen SC2 and display the first image P1 on the screen SC2 again.

Figure 10:
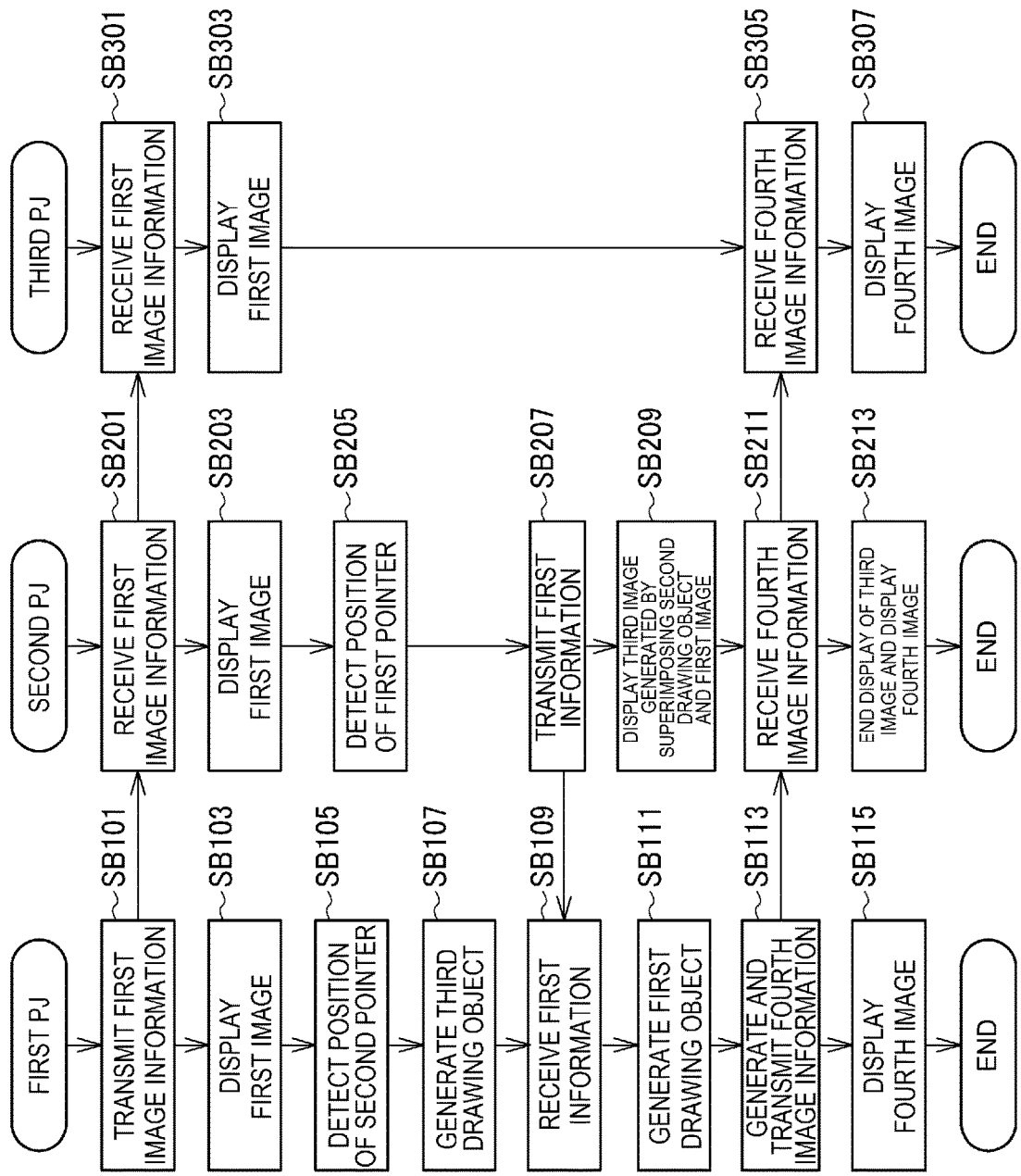
FIG. 10 is a flowchart showing another example of the processing of the first control section to the third control section.

FIG. 10 shows processing performed by each of the first control section 150, the second control section 250, and the third control section 350 when the first projector 100 receives an input from the pointer 3A.

As shown in FIG. 10, the first control section 150 of the first projector 100 executes the processing as explained below.

First, in step SB101, the first control section 150 receives an image signal from the external device 180 and generates the first image information PJ1. The first transmitting and receiving section 173 transmits the first image information PJ1 to each of the second projector 200 and the third projector 300.

Subsequently, in step SB103, the first display control section 175 displays the first image P1 corresponding to the first image information PJ1 on the screen SC1.

Subsequently, in step SB105, the first position detecting section 171 detects a pointed position of the pointer 3A (the second pointer) and generates the second image J2 indicating a track of the pointed position of the pointer 3A.

Subsequently, in step SB107, the first control section 150 generates the third drawing object BJ3 based on the second information J2. The first control section 150 superimposes the third drawing object BJ3 and the first image P1 to thereby generate the fifth image information PJ5. The first display control section 175 displays the fifth image P5 corresponding to the fifth image information PJ5 instead of the first image P1 on the screen SC1.

Subsequently, in step SB109, the first transmitting and receiving section 173 receives the first information J1 from the second projector 200.

Subsequently, in step SB111, the first control section 150 generates the first drawing object BJ1 based on the first information J1.

Subsequently, in step SB113, the first control section 150 superimposes the first drawing object BJ1, the third drawing object BJ3, and the first image P1 to thereby generate the fourth image information PJ4. The first transmitting and receiving section 173 transmits the fourth image information PJ4 to each of the second projector 200 and the third projector 300.

Subsequently, in step SB115, the first display control section 175 displays the fourth image P4 corresponding to the fourth image information PJ4 instead of the fifth image P5. The processing ends.

The second control section 250 of the second projector 200 executes the processing as explained below.

First, in step SB201, the second transmitting and receiving section 273 receives the first image information PJ1 from the first projector 100.

Subsequently, in step SB203, the second display control section 275 displays the first image P1 corresponding to the first image information PJ1 on the screen SC2.

Subsequently, in step SB205, the second position detecting section 271 detects a pointed position of the pointer 3B (the first pointer) and generates the first information J1 indicating a track of the pointed position of the pointer 3B.

Subsequently, in step SB207, the second transmitting and receiving section 273 transmits the first information J1 to the first projector 100.

Subsequently, in step SB209, the second control section 250 generates the second drawing object BJ2 based on the first information J1 and superimposes the second drawing object BJ2 and the first image P1 to thereby generate the third image information PJ3. The second display control section 275 displays the third image P3 corresponding to the third image information PJ3 on the screen SC2.

Subsequently, in step SB211, the second transmitting and receiving section 273 receives the fourth image information PJ4 from the first projector 100.

Subsequently, in step SB213, the second display control section 275 ends the display of the third image P3 and displays the fourth image P4 corresponding to the fourth image information PJ4 on the screen SC2. The processing ends.

The third control section 350 of the third projector 300 executes the processing as explained below.

First, in step SB301, the third transmitting and receiving section 373 receives the first image information PJ1 from the first projector 100.

Subsequently, in step S303, the third display control section 375 displays the first image P1 corresponding to the first image information PJ1 on the screen SC3.

Subsequently, in step SB305, the third transmitting and receiving section 373 receives the fourth image information PJ4 from the first projector 100.

Subsequently, in step SB307, the third display control section 375 displays the fourth image P4 corresponding to the fourth image information PJ4 on the screen SC3. The processing ends.

In this embodiment, when receiving the fourth image information PJ4 from the first projector 100, the second display control section 275 ends the display of the third image P3 on the screen SC2. However, the embodiments of the present disclosure are not limited to this. When a predetermined time has elapsed after the second display control section 275 starts the display of the third image P3 on the screen SC2, the second display control section 275 may end the display of the third image P3 on the screen SC2.

Further, when the predetermined time has elapsed, the second display control section 275 may end the display of the third image P3 on the screen SC2 and display the first image P1 on the screen SC2 again.

3. This Embodiment and Effects

A control method for the display system 1 according to this embodiment is a control method for the display system 1 including the first projector 100, the second projector 200, and the third projector 300 communicably coupled to one another. The first projector 100 transmits the first image information PJ1 to each of the second projector 200 and the third projector 300. The second projector 200 displays the first image P1 on the screen SC2 based on the first image information PJ1. The second projector 200 detects the position of the pointer 3B with respect to the screen SC2. The second projector 200 transmits the first information J1 indicating the position of the pointer 3B to the first projector 100. The first projector 100 generates the first drawing object BJ1 based on the first information J1 and transmits the second image information PJ2 including the first drawing object BJ1 to each of the second projector 200 and the third projector 300. Each of the second projector 200 and the third projector 300 displays the second image P2 based on the second image information PJ2.

In this way, the second projector 200 transmits the first information J1 indicating the position of the pointer 3B to the first projector 100. The first projector 100 generates the first drawing object BJ1 based on the first information J1 and transmits the second image information PJ2 including the first drawing object BJ1 to each of the second projector 200 and the third projector 300. Therefore, even a projector not having a pen drawing function like the third projector 300 can share information such as a character or a figure input by a pen.

The second projector 200 is prohibited from transmitting the first image information PJ1 and the second image information PJ2 to the fourth projector 400 communicably coupled to the second projector 200. The third projector 300 is prohibited from transmitting the first image information PJ1 and the second image information PJ2 to the fifth projector 500 communicably coupled to the third projector 300.

Accordingly, it is possible to suppress at least one of the first image information PJ1 and the second image information PJ2 from being transmitted to at least one of the fourth projector 400 and the fifth projector 500. Therefore, when confidential information or the like is included in the first image information PJ1 and the second image information PJ2, it is possible to suppress a leakage of the confidential information or the like.

The second projector 200 is prohibited from transmitting the first image information PJ1 and the second image information PJ2 to the fourth projector 400 by being prohibited from displaying the menu for executing the server function. The third projector 300 is prohibited from transmitting the first image information PJ1 and the second image information PJ2 to the fifth projector 500 by being prohibited from displaying the menu for executing the server function.

Therefore, it is possible to suppress, with a simple configuration, at least one of the first image information PJ1 and the second image information PJ2 from being transmitted to at least one of the fourth projector 400 and the fifth projector 500.

The second projector 200 generates the second drawing object BJ2 based on the first information J1 and displays the third image P3 including the second drawing object BJ2 on the screen SC2.

The second drawing object BJ2 corresponds to information such as a character or a figure drawn on the screen SC2 by the pointer 3B. Accordingly, before receiving the second image information PJ2, the second projector 200 can display the second drawing object BJ2 on the screen SC2. Therefore, it is possible to reduce discomfort of the user.

When a predetermined time has elapsed after the display of the third image P3 on the screen SC2 is started, the second projector 200 ends the display of the third image P3 on the screen SC2.

Therefore, when the predetermined time has elapsed after the display of the third image P3 on the screen SC2 is started, since the second projector 200 ends the display of the third image P3 on the second screen SC2, it is possible to improve convenience of the user by setting the predetermined time to a proper time.

When receiving the second image information PJ2 from the first projector 100, the second projector 200 ends the display of the third image P3 on the screen SC2.

Accordingly, when receiving the second image information PJ2 from the first projector 100, the second projector 200 ends the display of the third image P3 on the screen SC2. Therefore, the second projector 200 can display the second image P2 on the screen SC2 instead of the third image P3. Therefore, it is possible to reduce discomfort of the user.

The second projector 200 detects the position of the pointer 3B with respect to the display region for the first image P1 in the screen SC2.

Accordingly, since the second projector 200 detects the position of the pointer 3B with respect to the display region for the first image P1 in the screen SC2, the second projector 200 can properly detect the position of the pointer 3B. Therefore, the second projector 200 can display an object desired by the user on the screen SC2.

The first projector 100 superimposes the first drawing object BJ1 on the first image P1 and generates the second image information PJ2.

Accordingly, since the first projector 100 superimposes the first drawing object BJ1 on the first image P1 and generates the second image information PJ2, a proper image is generated as the second image P2. Therefore, the first projector 100 can display an image desired by the user.

The first projector 100 displays the first image P1 on the screen SC1, detects the position of the pointer 3A with respect to the screen SC1, generates the third drawing object BJ3 based on the position of the pointer 3A, and transmits the fourth image information PJ4 including the first drawing object BJ1 and the third drawing object BJ3 to each of the second projector 200 and the third projector 300. Each of the second projector 200 and the third projector 300 displays the fourth image P4 based on the fourth image information PJ4.

Accordingly, since the fourth image information PJ4 includes the first drawing object BJ1 and the third drawing object BJ3, the first drawing object BJ1 and the third drawing object BJ3 are displayed on each of the screen SC2 and the screen SC3. The first drawing object BJ1 corresponds to information such as a character or a figure drawn on the screen SC2. The third drawing object BJ3 corresponds to information such as a character or a figure drawn on the screen SC1. Therefore, it is possible to improve convenience of the user.

The first projector 100 superimposes the first drawing object BJ1 and the third drawing object BJ3 on the first image P1 and generates the fourth image information PJ4.

Accordingly, since the first projector 100 superimposes the first drawing object BJ1 and the third drawing object BJ3 on the first image P1 and generates the fourth image information PJ4, a proper image is generated as the fourth image P4. Therefore, the first projector 100 can display an image desired by the user.

The display system 1 according to this embodiment is the display system 1 including the first projector 100, the second projector 200, and the third projector 300 communicably coupled to one another. The first projector 100 includes the first transmitting and receiving section 173 that transmits the first image information PJ1 to each of the second projector 200 and the third projector 300. The second projector 200 includes the second display control section 275 that displays the first image P1 on the screen SC2 based on the first image information PJ1, the second position detecting section 271 that detects the position of the pointer 3B with respect to the screen SC2, and the second transmitting and receiving section 273 that transmits the first information J1 indicating the position of the pointer 3B to the first projector 100. The first projector 100 generates the first drawing object BJ1 based on the first information J1. The first transmitting and receiving section 173 transmits the second image information PJ2 including the first drawing object BJ1 to each of the second projector 200 and the third projector 300. Each of the second projector 200 and the third projector 300 displays the second image P2 based on the second image information PJ2.

In this way, the second projector 200 transmits the first information J1 indicating the position of the pointer 3B to the first projector 100. The first projector 100 generates the first drawing object BJ1 based on the first information J1 and transmits the second image information PJ2 including the first drawing object BJ1 to each of the second projector 200 and the third projector 300. Therefore, even a projector not having a pen drawing function like the third projector 300 can share information such as a character or a figure input by a pen.

4. Other Embodiments

The embodiment explained above is only an example of a specific form applied with the present disclosure and does not limit the present disclosure. The present disclosure can also be applied as different forms.

For example, in the embodiment explained above, the "projector" is explained as an example of the "display device." However, the "display device" such as the first display device to the third display device according to the present disclosure may be a liquid crystal display or may be a display device including a plasma display panel or an organic EL panel.

In the embodiment explained above, the first information J1 indicates the track of the pointed position of the pointer 3B. However, the embodiments of the present disclosure are not limited to this. The first information J1 may include, in addition to the information indicating the track of the pointed position of the pointer 3B, at least one of information indicating a type of a line, information indicating thickness of the line, and information indicating a color of the line. In this case, various images can be generated as the second image P2. Therefore, it is possible to improve convenience of the user.

When the control method for the display device is realized using a computer included in the display device, a program to be executed by the computer can also be configured in a form of a recording medium or a transfer medium for transferring the program. As the recording medium, a magnetic or optical recording medium or a semiconductor memory device can be used. Specifically, examples of the recording medium include portable and stationary recording media such as a flexible disk, a HDD, a CD-ROM (Compact Disk Read Only Memory), a DVD (Digital Versatile Disk), a Blu-ray (registered trademark) Disc, a magneto-optical disk, a flash memory, and a card-type recording medium. The recording medium may be a nonvolatile storage device such as a RAM, a ROM, or a HDD, which is an internal storage device included in an image display apparatus.

At least apart of the functional blocks of the first projector 100 shown in FIG. 3 may be realized by hardware or may be realized by cooperation of hardware and software. The first projector 100 is not limited to the configuration in which the independent hardware resources are disposed as shown in FIG. 3 and may include functional sections other than the functional sections shown in FIG. 3.

At least apart of the functional blocks of the first control section 150, the second control section 250, and the third control section 350 shown in FIG. 4 may be realized by hardware and may be realized by cooperation of software and hardware.

Processing units of the flowcharts of FIGS. 9 and 10 are divided according to main processing contents in order to facilitate understanding of the processing of the first control section 150, the second control section 250, and the third control section 350. Accordingly, the present disclosure is not limited by a way of the division and names of the processing units shown in the flowcharts of FIGS. 9 and 10. According to processing contents, the processing of the first control section 150, the second control section 250, and the third control section 350 can be divided into a larger number of processing units or can be divided such that one processing unit includes a larger number of kinds of processing. The processing order of the flowcharts explained above is not limited to the example shown in FIGS. 9 and 10.

What is claimed is:

1. A control method for a display system including a first display device, a second display device, and a third display device communicably coupled to one another, the control method comprising:
    transmitting, by the first display device, first image information to each of the second display device and the third display device;
    displaying, by the second display device, a first image on a first display surface based on the first image information;
    detecting, by the second display device, a position of a first pointer with respect to the first display surface;
    transmitting, by the second display device, first information indicating the position of the first pointer to the first display device;
    generating, by the first the first display device, a first drawing object based on the first information and transmitting, by the first the first display device, second image information including the first drawing object to each of the second display device and the third display device; and
    displaying, by each of the second display device and the third display device, a second image based on the second image information, wherein:
        the third display device is prohibited from inputting a position from a pointer,
        the first image information and the second image information are transmitted to the third display device via the second display device,
        the second display device is prohibited from transmitting the first image information and the second image information to a fourth display device communicably coupled to the second display device,
        the third display device is prohibited from transmitting the first image information and the second image information to a fifth display device communicably coupled to the third display device,
        the second display device is prohibited from transmitting the first image information and the second image information to the fourth display device by being prohibited to display a menu for executing a server function, and
        the third display device is prohibited from transmitting the first image information and the second image information to the fifth display device by being prohibited to display the menu.

2. The control method for a display system according to claim 1, wherein the second display device generates a second drawing object based on the first information and displays a third image including the second drawing object on the first display surface.

3. The control method for a display system according to claim 2, wherein the second display device ends the display of the third image on the first display surface when a predetermined time elapses after the display of the third image on the first display surface is started.

4. The control method for a display system according to claim 2, wherein the second display device ends the display of the third image on the first display surface when receiving the second image information from the first display device.

5. The control method for a display system according to claim 1, wherein the second display device detects the position of the first pointer with respect to a display region for the first image on the first display surface.

6. The control method for a display system according to claim 1, wherein the first display device superimposes the first drawing object on the first image and generates the second image information.

7. The control method for a display system according to claim 1, wherein
    the first display device displays the first image on a second display surface, detects a position of a second pointer with respect to the second display surface, generates a third drawing object based on the position of the second pointer, and transmits fourth image information including the first drawing object and the third drawing object to each of the second display device and the third display device, and
    each of the second display device and the third display device displays a fourth image based on the fourth image information.

8. The control method for a display system according to claim 7, wherein the first display device superimposes the first drawing object and the third drawing object on the first image and generates the fourth image information.

9. A display system comprising a first display device, a second display device, and a third display device communicably coupled to one another, wherein
    the first display device includes a first transmitting section configured to transmit first image information to each of the second display device and the third display device,
    the second display device includes:
        a display control section configured to display a first image on a first display surface based on the first image information;
        a position detecting section configured to detect a position of a pointer with respect to the first display surface; and
        a second transmitting section configured to transmit first information indicating the position of the pointer to the first display device,
    the first display device generates a drawing object based on the first information,
    the first transmitting section transmits second image information including the drawing object to each of the second display device and the third display device,
    each of the second display device and the third display device displays a second image based on the second image information, wherein:
        the third display device is prohibited from inputting a position from a pointer, and
        the first image information and the second image information are transmitted to the third display device via the second display device,
    the second display device is prohibited from transmitting the first image information and the second image information to a fourth display device communicably coupled to the second display device,
    the third display device is prohibited from transmitting the first image information and the second image information to a fifth display device communicably coupled to the third display device,
    the second display device is prohibited from transmitting the first image information and the second image information to the fourth display device by being prohibited to display a menu for executing a server function, and the third display device is prohibited from transmitting the first image information and the second image information to the fifth display device by being prohibited to display the menu.

* * * * *